United States Patent
Royer

(10) Patent No.: US 7,671,739 B2
(45) Date of Patent: Mar. 2, 2010

(54) SYSTEM AND METHOD FOR IMPLEMENTING RANGING MICROWAVE FOR DETECTOR RANGE REDUCTION

(75) Inventor: Gregory Royer, Walworth, NY (US)

(73) Assignee: Robert Bosch GmbH, Stuttgart, DE (US)

( * ) Notice: Subject to any disclaimer, the term of this patent is extended or adjusted under 35 U.S.C. 154(b) by 325 days.

(21) Appl. No.: 11/715,201

(22) Filed: Mar. 7, 2007

(65) Prior Publication Data

US 2008/0218341 A1  Sep. 11, 2008

(51) Int. Cl.
   *G08B 13/00* (2006.01)
(52) U.S. Cl. ............... 340/541; 340/539.23; 340/545.3
(58) Field of Classification Search ................. 340/541, 340/545.2, 545.3, 539.23
   See application file for complete search history.

(56) References Cited

U.S. PATENT DOCUMENTS

| | | | |
|---|---|---|---|
| 3,801,978 A * | 4/1974 | Gershberg et al. .......... | 340/516 |
| 4,611,197 A * | 9/1986 | Sansky ....................... | 340/522 |
| 4,833,450 A * | 5/1989 | Buccola et al. ............. | 340/506 |
| 4,882,567 A * | 11/1989 | Johnson ....................... | 340/522 |
| 5,216,410 A * | 6/1993 | Pildner et al. ............... | 340/509 |
| RE34,501 E | 1/1994 | Jean et al. | |
| 5,276,427 A | 1/1994 | Peterson | |
| 5,331,308 A | 7/1994 | Buccola et al. | |
| 5,453,733 A | 9/1995 | Peterson et al. | |
| 5,475,365 A | 12/1995 | Hoseit et al. | |
| 5,504,473 A * | 4/1996 | Cecic et al. ................. | 340/541 |
| 5,631,639 A | 5/1997 | Hibino et al. | |
| 5,751,211 A | 5/1998 | Shirai et al. | |
| 5,754,099 A | 5/1998 | Nishimura et al. | |
| 6,018,308 A | 1/2000 | Shirai | |
| 6,127,926 A | 10/2000 | Dando | |
| 6,188,318 B1 * | 2/2001 | Katz et al. .................. | 340/545.3 |
| 6,191,688 B1 | 2/2001 | Sprouse | |
| 6,239,736 B1 | 5/2001 | McDonald et al. | |

(Continued)

FOREIGN PATENT DOCUMENTS

EP  1 873 553 A  1/2008

(Continued)

OTHER PUBLICATIONS

Search and Examination Report for corresponding European Patent Application 08400009.0 issued by the European Patent Office on May 23, 2008.

*Primary Examiner*—Eric M Blount
(74) *Attorney, Agent, or Firm*—Baker & Daniels LLP

(57) ABSTRACT

Embodiments of the present invention are directed to a method and system for use of ranging MW to detect range reduction in a dual (MW/PIR) intrusion detector. Embodiments of the invention utilize a Doppler microwave system capable of detecting an object range. Multiple range limited MW stages may be configured for different ranges to determine the general range of the moving object. Based on signal levels present on these MW stages, an approximate object range and size is determined. Embodiments of the invention recognize cases of PIR range reduction by use of range limited MW stages configured for different ranges to determine the general range of the moving object. If the MW recognizes a moving object of sufficient size within the coverage area, and if no PIR signal is present, the PIR is recognized as being blocked or disabled and notification is provided.

33 Claims, 6 Drawing Sheets

U.S. PATENT DOCUMENTS

| | | | |
|---|---|---|---|
| 6,265,970 B1 * | 7/2001 | Whitehead | 340/506 |
| 6,351,234 B1 * | 2/2002 | Choy | 340/541 |
| 6,720,874 B2 | 4/2004 | Fufido et al. | |
| 6,872,948 B2 * | 3/2005 | Lee | 250/342 |
| 7,126,476 B2 * | 10/2006 | Alkelai et al. | 340/565 |
| 7,495,544 B2 * | 2/2009 | Stilp | 340/10.1 |
| 2004/0140892 A1 | 7/2004 | Hanood | |
| 2004/0160324 A1 | 8/2004 | Stilp | |
| 2004/0212493 A1 * | 10/2004 | Stilp | 340/531 |
| 2005/0024208 A1 | 2/2005 | Maki et al. | |
| 2005/0128067 A1 | 6/2005 | Zakrewski | |
| 2005/0134450 A1 | 6/2005 | Kovach | |
| 2007/0176765 A1 * | 8/2007 | Babich et al. | 340/522 |

FOREIGN PATENT DOCUMENTS

| | | |
|---|---|---|
| GB | 2 311 158 A | 9/1997 |
| GB | 2 441 285 A | 2/2008 |
| JP | 2004157102 A | 6/2004 |
| WO | WO 98/34206 A | 8/1998 |
| WO | WO 99/27335 | 6/1999 |
| WO | WO 2006/082405 A | 8/2006 |
| WO | WO 2006/109771 A | 10/2006 |
| WO | WO 2006/137477 A | 12/2006 |
| WO | WO 2007/089413 A2 | 8/2007 |

* cited by examiner

| Detector Range | Insect Bin | | Short Range Bin | | Mid Range Bin | | Long Range Bin | |
|---|---|---|---|---|---|---|---|---|
| | Range | Tinsect | Range | Tshort | Range | Tmid | Range | Tlong |
| 30ft | 3ft | 20nS | 13ft | 40nS | 26ft | 70nS | 30ft | 90nS |
| 40ft | 3ft | 20nS | 13ft | 40nS | 26ft | 70nS | 40ft | 105nS |
| 50ft | 3ft | 20nS | 13ft | 40nS | 36ft | 95nS | 50ft | 130nS |
| 60ft | 3ft | 20nS | 13ft | 40nS | 36ft | 95nS | 60ft | 155nS |

FIG 4

SYSTEM AND METHOD FOR IMPLEMENTING RANGING MICROWAVE FOR DETECTOR RANGE REDUCTION

TECHNICAL FIELD

Embodiments of the present invention relate to motion detectors. More particularly, embodiments of the invention are directed to improving the performance of dual detector systems.

BACKGROUND OF THE INVENTION

Currently, in the field of security systems, motion detectors are generally provided to detect intruders. Dual technology motion detectors incorporate multiple sensing technologies in order to provide efficient intruder detection with minimized risk of false alarms. Many dual detectors incorporate passive infrared (PIR) technology and microwave (MW) technology.

PIR technology has long been used in motion detectors. The PIR sensor detects the difference between the infrared energy emitted from an intruder and that emitted from the ambient environment. Many PIR detectors utilize Fresnel lenses or custom shaped mirrors to focus infrared energy on a pyrodetector. The output signal from the pyrodetector is then processed via analog hardware and/or digital signal processing. Lenses and mirrors are designed to provide various detection zones emanating radially from the sensor. As a target moves across the PIR detection zones, the sensing elements within the pyrodetector are alternately exposed to the target IF energy, resulting in an alternating voltage output from the PIR sensor. The amplitude and frequency of this voltage vary with a number of factors including target size, speed, and direction relative to the PIR zones, difference between ambient and target temperature, width and spacing between the detection zones, and frequency response of the pyrodetector.

Upon receiving the signals, the detector may perform processing by comparing the received signal to one or more voltage thresholds. These threshold crossings produce positive and negative pulses that can be counted and timed, with certain combinations of pulse height, duration, and frequency being considered PIR alarms.

MW technology often operates on the principle of phase shift or Doppler effect. Unlike PIR, MW technology is an active technology. The MW detector transmits MW energy, which reflects off objects and returns to the MW detector. Moving objects result in a received signal that is frequency shifted from the original transmitted signal. The detector receives this signal, and generates an alternating voltage difference frequency signal which is then processed via hardware or digital signal processing. Because only the AC (alternating current) component of the signal is processed, only moving objects are detected. The frequency of the returned signal is dependent upon the target movement direction and speed. The amplitude is a function of transmitted signal strength, target size, distance, and reflectivity. Highly reflective materials such as metal will return significantly greater energy to the detector than less reflective objects such as people or animals. Processing may include comparison of the MW signal to one or more thresholds with certain combinations of quantity, duration, or frequency of threshold crossings considered MW alarms.

Typically, dual technology detectors incorporate an AND function, whereby both individual sensor technologies must be in the alarm state simultaneously to produce an alarm at the detector output. Thus, if either the MW or PIR detectors are disabled, the system will fail to generate an alarm. PIR motion detectors are susceptible to being blocked or disabled. Generally, if the PIR motion detector is blocked, the dual detector system fails to recognize the blockage and will thus also fail to alarm. A system is needed for recognizing this problem and allowing the dual detector system to generate an alarm and/or provide notification that the range of the detector has been reduced.

Some currently existing systems, such as that of U.S. Patent Application No. 2004/0160324 disclose the use of a dual detector system in which a technique is provided for determining if a PIR sensor may be blocked. However, this system does not automatically make this determination and provide output based on this determination. Accordingly, a solution is need that automatically detects PIR detector blockage and makes alarm decisions, and/or provides trouble indication based on this determination.

BRIEF SUMMARY OF THE INVENTION

In one aspect, a method for making a range reduction determination within a dual detector system is provided. The dual detector system may include at least one MW sensor having a MW coverage area and at least one PIR sensor having a PIR coverage area. The method may include detecting a MW signal from a target within the MW coverage area in the absence of a PIR signal and determining a target range for a detected target from the received MW signal. The method may additionally include comparing the target range to the PIR range to determine whether the PIR range is reduced.

In yet a further aspect of the invention, a system may be provided for making a range reduction determination within a dual intrusion detector. The dual intrusion detector may include at least one MW sensor having a MW coverage range and at least one PIR sensor having a PIR coverage range. The system may include multiple range bins for classifying MW signals and a range/size determination module for estimating a target range based on a state of each of the multiple range bins. Additionally, target size may be estimated by use of the determined range and signal levels. The system may additionally include a range reduction component for determining whether at least one PIR sensor within the dual intrusion detector has a reduced PIR coverage range.

In yet a further aspect of the invention, a method may be provided for making a range reduction determination for a dual intrusion detector. The dual intrusion detector may include at least one MW sensor having a MW coverage area and at least one PIR sensor having a PIR coverage area. The method may include classifying a received MW signal into a range bin and estimating a target range based on a range bin state comparison. Additionally, target size may be estimated by use of the determined range and signal levels. The method may additionally include making a range reduction determination for the PIR sensor based on a comparison of the target range and the PIR coverage area.

BRIEF DESCRIPTION OF THE DRAWINGS

The present invention is described in detail below with reference to the attached drawings figures, wherein:

FIG. 4 is a table illustrating approximate range bin configurations in accordance with an embodiment of the invention;

DETAILED DESCRIPTION OF PREFERRED EMBODIMENTS

Embodiments of the present invention are directed to a system and method for recognizing PIR range reduction in a dual detector system. As set forth above, PIR range reduction may occur if a PIR sensor is blocked by a tall object such as a bookcase or room divider or by other items in the PIR sensor path. Because dual technology intrusion detectors often operate on the principle that both the MW and PIR sensors must detect a moving object simultaneously or nearly simultaneously in order to generate an alarm, the dual detector system will fail to generate an alarm if either sensor is blocked. Accordingly, embodiments of the invention include a MW detector that determines a range or distance from the detector of a detected object and furthermore determine whether this object is within the PIR sensor range. Determination of target range may incorporate multiple range limited MW stages configured for different ranges to determine the general or approximate range of a moving object If the object is determined by the MW to be sufficiently large and not simply background MW noise and within the PIR sensor range and the PIR sensor does not detect the object, the system may send a trouble notification and/or generate an alarm indicating a possible blockage of the PIR sensor. This range reduction detection is preferably limited to the useful range of the detector. That is, objects outside the desired detection range preferably are not subject to this detection in order to minimize chances of false range reduction indications. It is also desirable that the system limit range reduction detection to cases where a MW target is detected of sufficient size that a reasonably large PIR signal might be expected. This will minimize false indications resulting from small animals crawling behind furniture or other small or low profile objects that do not inhibit the PIR from normal human detection.

Figure 1:
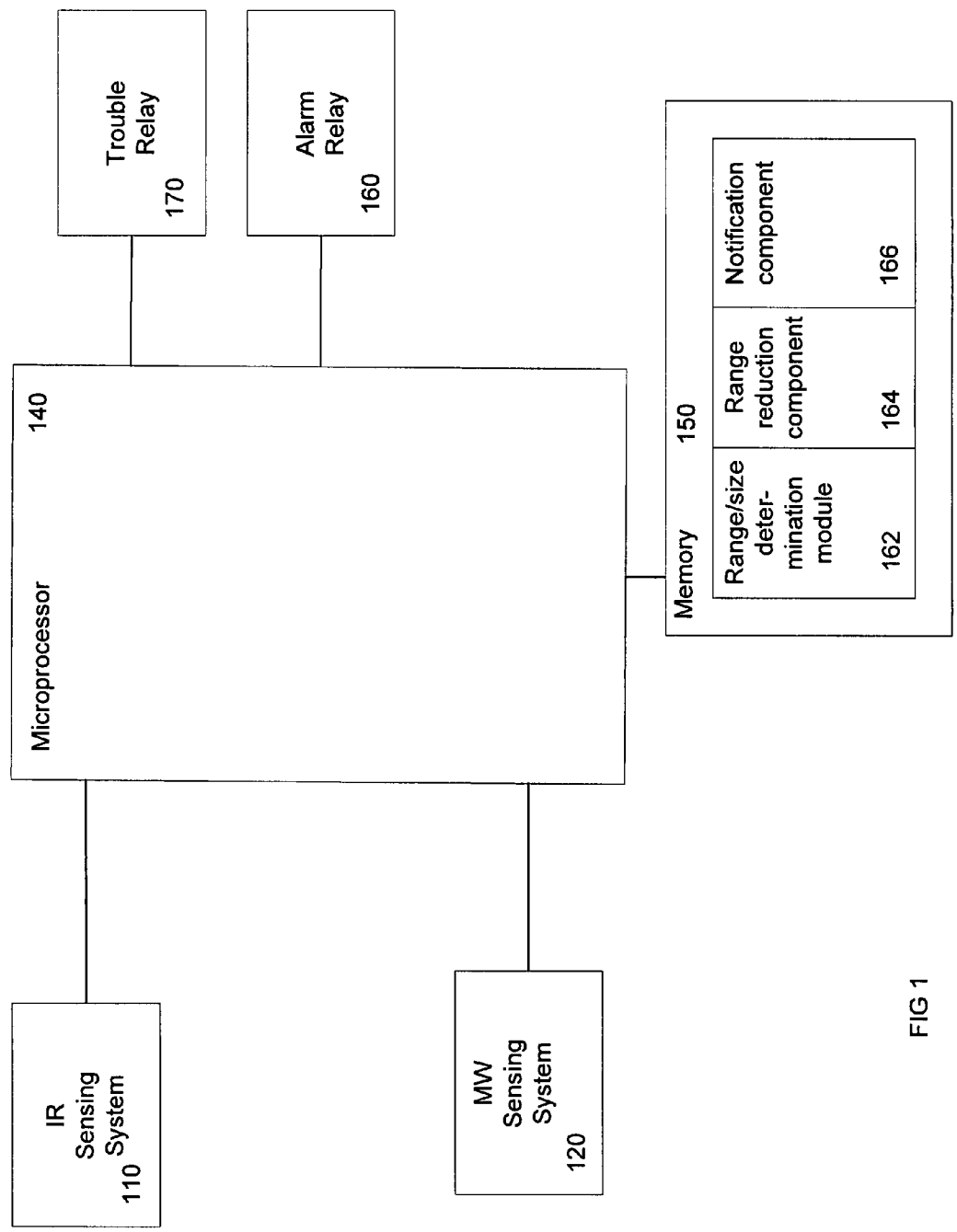
FIG. 1 is a block diagram illustrating an intrusion detection system in accordance with an embodiment of the invention.

FIG. 1 is a block diagram illustrating a dual detector system 100. A PIR sensing system 110 and a MW sensing system 120 may be connected with a microprocessor 140. The microprocessor 140 may be connected with a memory 150 having modules serving multiple functions. The memory 150 may include a target range/size determination module 162, a range reduction component 164, and a notification component 166. The microprocessor 140 may also be connected with an alarm relay 160 for triggering an intrusion alarm and a trouble relay 170 for indicating trouble conditions.

The PIR sensing system 110 may operate in a conventional manner by utilizing lenses or mirrors to focus infrared energy on a pyrodetector. The output signal from the pyrodetector is then processed via analog hardware and/or digital signal processing.

The MW sensing system 120, embodiments of which are further described below with reference to FIG. 2 may include a transceiver having transmitting and receiving antennas. The transmitting antenna transmits microwave energy generally into microwave detection space. As the microwave signals impinge on an object in MW space, at least some of the MW signals are reflected toward the receiving antenna. Depending on the characteristics of the reflected signal, the detector may generate a voltage signal that indicates the presence of a moving object.

The microprocessor 140 may include any type of microprocessor, such as a microcontroller having integral memory chips. The modules 162, 164, and 166 may be or include memory chips integral with a microcontroller. The functions of the modules 162, 164, and 166 may also be performed partially or entirely by hardware components. As shown, the microprocessor 140 also may be connected with the discrete memory 150.

The memory 150 may include computer storage media in the form of volatile and/or nonvolatile memory such as read only memory (ROM) and random access memory (RAM). A basic input/output system (BIOS), containing the basic routines that help to transfer information between elements within the security system environment 100, such as during start-up, may be stored in ROM. RAM typically contains data and/or program modules that are immediately accessible to and/or presently being operated on by microprocessor 140.

The RAM may include an operating system, program data, and application program. The application programs may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, micro-processor-based or programmable consumer electronics, minicomputers, mainframe computers, and the like.

Regardless of its type, the memory 150 may include firmware, hardware, or software modules that perform the function specified by the target range/size determination module 162, the range reduction component 164, and the notification component 166.

The alarm relay 160 may be operable to trigger an alarm upon detecting a security violation. The alarm system may activate any appropriate type of visible or audible alarm including both remote and proximal alarms. As set forth above, typically, both the MW sensing system 120 and the PIR sensing system 110 must exhibit alarm conditions in order for an alarm to be triggered.

The trouble relay 170 may be operable to trigger an indication upon detecting various trouble conditions such as improper operation, tamper detection, or range reduction. The trouble system may activate any appropriate type of visible or audible alarm including both remote and proximal alarms.

Figure 2:
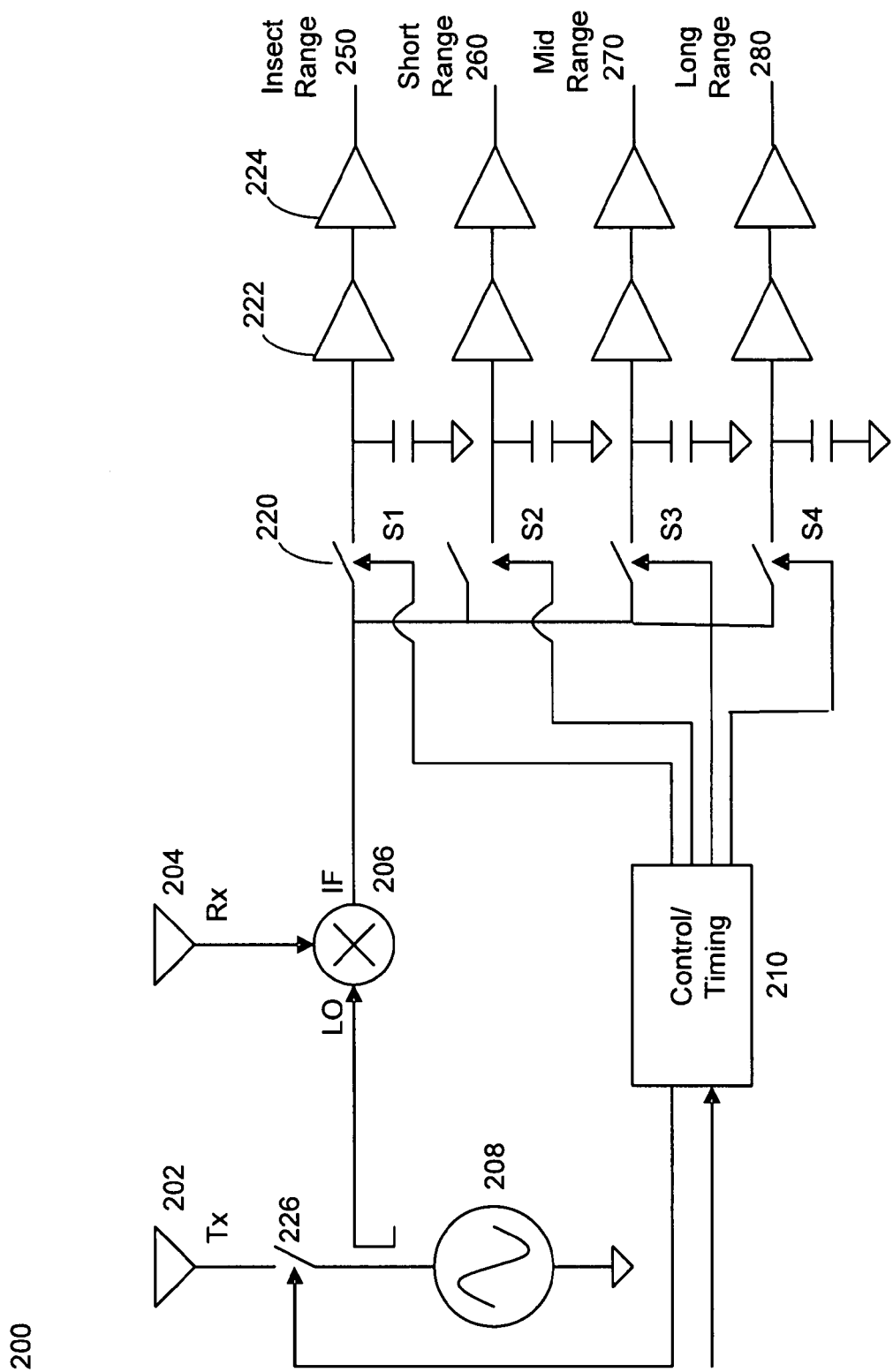
FIG. 2 is a block diagram illustrating a ranging MW detection system in accordance with an embodiment of the invention.

FIG. 2 illustrates a microwave sensing system 200 in accordance with an embodiment of the invention. The system is preferably a Doppler based system that detects moving objects. The MW detection system may include a transmitter including an oscillator 208, a switch 226, and a transmitting antenna 202. A receiver antenna 204 receives signals returned from a moving target and delivers the signals to a mixer 206. The mixer 206 produces IF output that may include a low frequency signal. The IF output may, for example, include a signal of frequency approximately equal to 31 Hz/mph of target radial velocity, which is the component of the target velocity vector directed toward or away from the microwave sensing system 200.

The embodiment illustrated in FIG. 2 includes four range bins 250, 260, 270, and 280. However, alternative embodiments may include as few as one bin and an unlimited number of additional bins depending upon the total target detection area. Each range bin covers a specified area beyond the detector. An insect range bin 250, a short range bin 260, a mid range bin 270, and a long range bin 280 are illustrated in FIG. 2.

Each bin 250, 260, 270, and 280 may include a sample/hold circuit and two stages of gain and filtering as illustrated by 220, 222, and 224. Each range bin second gain stage output may be applied to an A/D converter. If necessary, it may also be possible to apply the range bin first gain stages to A/D inputs. This could prove useful for signal amplitude measurement in cases when the second gain stage output(s) saturate. It would then be necessary to determine the optimal distribution of total gain between the first and second stages of each bin. Appropriate gain and filter parameters may be adjusted for a particular detector application.

In an embodiment of the invention, the insect range bin 250 detects targets in a range from zero to three feet of the detector. The insect range bin 250 may detect insects crawling on the detector or flying very near the detector. A function of the insect range bin 250 is to aid in insect immunity in order to minimize false alarms.

The short range bin 260, in accordance with an embodiment of the invention, is designed to detect targets in a range of zero to thirteen feet from the detector. The short range bin may serve to detect crawling intruders under or near the detector and also to distinguish small animals from human intruders as will be further explained below.

The mid-range bin 270 may detect targets from zero to twenty six or thirty six feet from the detector. The mid-range coverage may vary with detector range setting. The mid-range bin may also serve to distinguish small animals from human intruders.

The long range bin 280 may have a coverage dependent upon the detector range as the long range bin may cover a range from the zero to the maximum detector coverage range. For instance, the long range bin 280 may detect targets from zero to thirty, forty, fifty, or sixty feet from the detector. Ideally, in embodiments of the invention, the MW detector system 200 will enter an alarm state when an intruder enters anywhere within the range of this bin.

In operation, the transmitter 202 is gated on and the IF signal is sampled for a fixed sample time afterward. This fixed sample time is determined by the free space propagation speed of the MW energy, or 1 ft/ns. For example, it takes 40 ns for energy to reach a target at a range of 20 ft, and return to the sensor. In reality, there are other considerations that influence range and optimal sample timing as well, such as MW transmit and receive antenna pattern shapes, and transmitter 202 time response.

Figure 3:
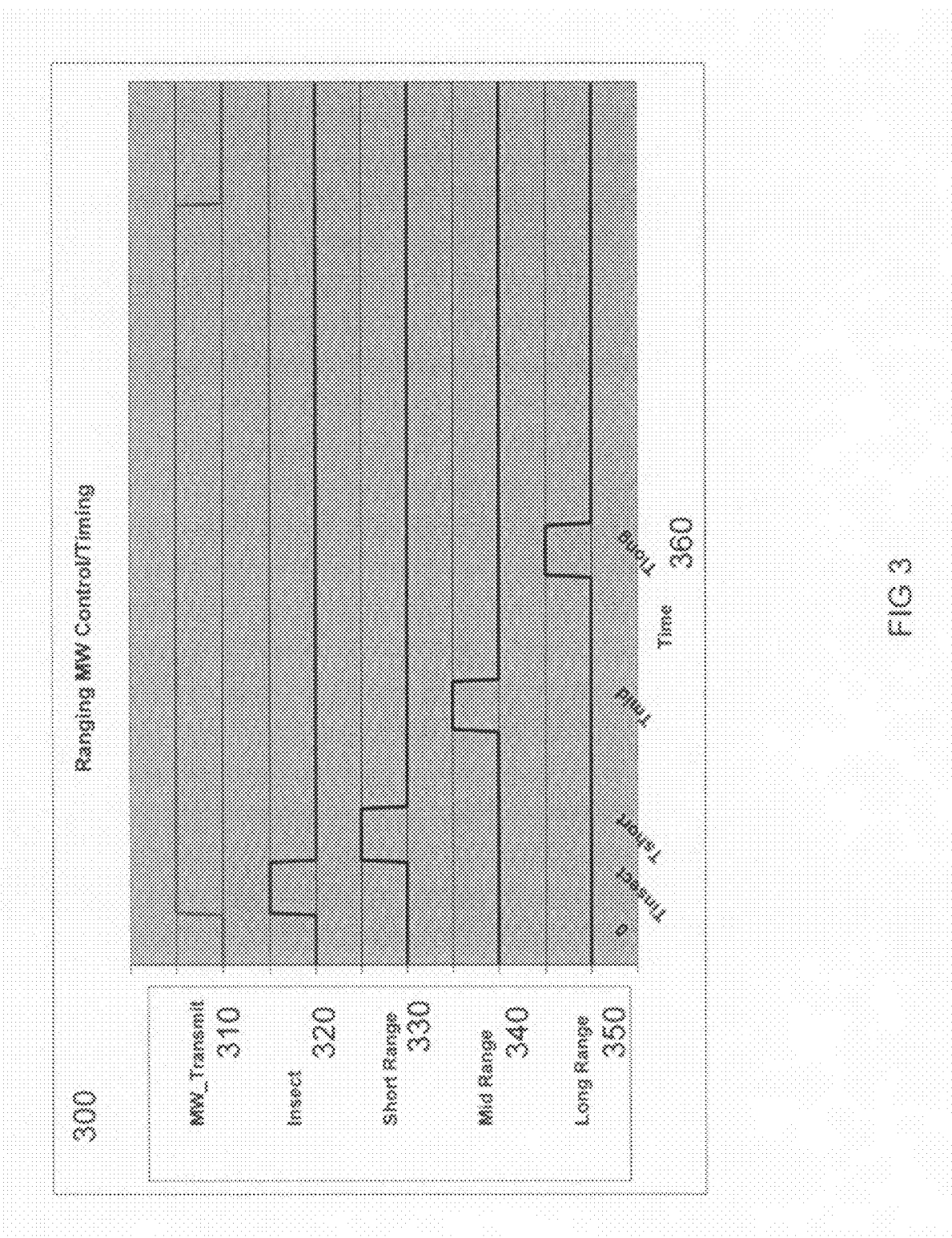
FIG. 3 is a timing diagram illustrating sample pulses for multiple range bins in accordance with an embodiment of the invention.

FIG. 3 is a timing diagram 300 illustrating a transmission pulse 310, and pulses 320, 330, 340, and 350 along the y-axis for each provided bin. The x-axis 360 represents time. Due to regulatory bandwidth requirements, as illustrated in FIG. 3, it is necessary for the MW transmissions to be very long relative to the sampling delays of the system. As a result, the MW transmitter continues to transmit during the sample periods, and long afterward, as shown by a transmission pulse 310 in the timing diagram 300. This has the result that a given sample will detect moving targets within the entire area bounded by the sensor and a maximum range determined by the conclusion of the sample pulse.

For example, referring to the mid range bin pulse 340 on the timing diagram 360, the delay between the beginning of MW transmission (MW_Transmit rising edge) and the end of the mid range sample pulse 340 is approximately 40 nS. Thus, theoretically the mid-range sample will detect moving targets in the range of zero feet to twenty feet from the detection system.

The ranging MW system uses precisely timed MW transmissions and returned signal samples to limit the effective detection range of the technology. Knowing the time (t) required for the transmitted energy to travel to a target at a given distance $d_{max}$ and return to the detector also(t), it is possible to limit the range to the distance $d_{max}$ by limiting the sampling of returned energy to that received before 2×t. This requires that transmission begin at a precisely known time and that returned signal samples occur at a very precise time afterward. This results in the MW ranging system detecting targets within distance $d_{max}$ and not detecting targets beyond $d_{max}$. Sampling the returned signal at multiple intervals creates the multiple range detection bins. One precisely placed sample pulse corresponds to each range bin and the time delay between MW transmission start and end of each sample determines the maximum range of a bin.

The start of MW transmission may be followed by one precisely placed returned signal sample for each range bin. Each range bin detects targets between the sensor and a maximum range defined by the time between the start of transmission and the end of its associated sample pulse. FIG. 3 shows the timing of the MW transmit signal and the four range samples. The effective range of each bin is determined by the time difference between the start of MW transmit signal and the end of the appropriate sample pulse. The placement of the sample pulses, and therefore the range of each bin, can be placed under control of user selectable switches or a microprocessor, allowing user configuration of the detector range.

FIG. 4 is a table 400 illustrating approximate range bin configurations for each detector range configuration in accordance with an embodiment of the invention. Column 410 illustrates a detector range in accordance with four embodiments of the invention. For each detector range 410, the four provided bins 420, 430, 440, and 450 have a pre-selected bin range and a signal sample time as illustrated under each bin. For the insect bin 420, the pre-selected bin range is three feet and the signal sample time is 20 ns for each of the detector ranges. For the short range bin 430, the pre-selected bin range is thirteen feet and the signal sample time is 40 ns for each of the detector ranges. For the mid-range bin 440, the pre-selected bin range is twenty six feet and the signal sample time is 70 ns for detector ranges of thirty and forty feet. For detector ranges of fifty and sixty feet, the pre-selected bin range is thirty six feet and the signal sample time is 95 ns. For the long range bin 450, the pre-selected bin range is thirty feet and the signal sample time is 90 ns for a detector range setting of thirty feet. For a detector range setting of forty feet, the pre-selected bin range is forty feet and the signal sample time is 105 ns. For a detector range of fifty feet, the pre-selected bin range is fifty feet and the signal sample time is 130 ns. For a detector setting of sixty feet, the pre-selected bin range is sixty feet and the signal sample time is 155 ns.

Figure 5:
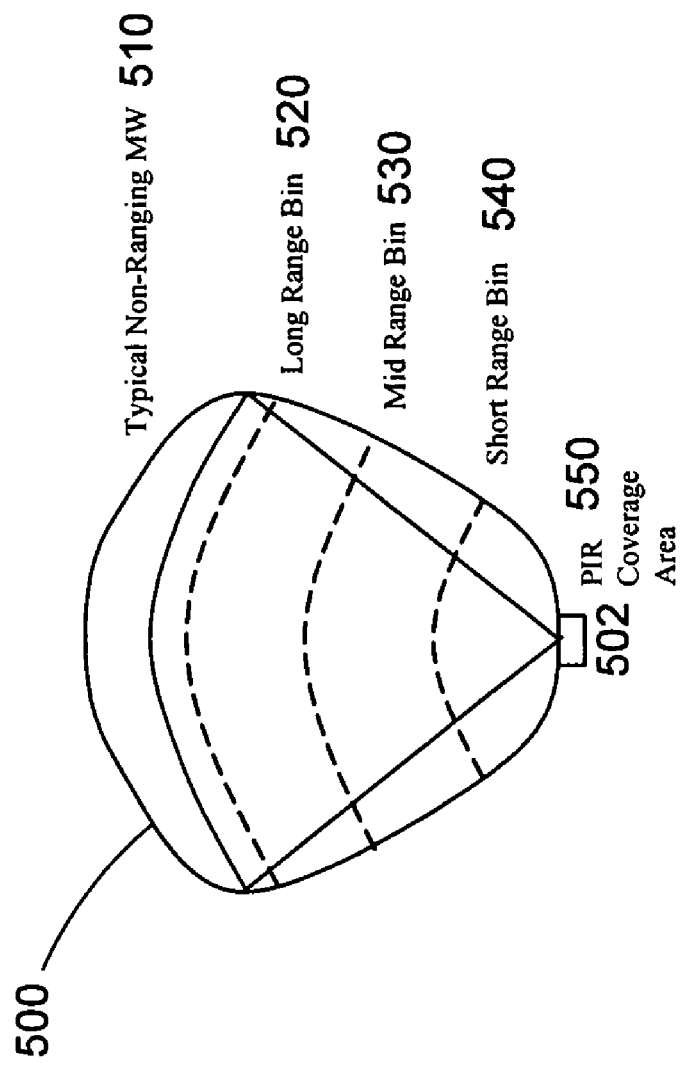
FIG. 5 is a range diagram illustrating coverage areas in accordance with an embodiment of the invention.

FIG. 5 illustrates a detector coverage area 500 in accordance with an embodiment of the invention. The coverage area 500 shows a detector 502 having a PIR coverage area 550 (two solid lines emanating directly from detector at an angle of approximately 90° and ending at inner solid arc), a typical non ranging MW coverage area 510 (entire outer solid curve), a long range bin coverage area 520 (outer dashed arc), a mid-range bin coverage area 530 (middle dashed arc), and a short range bin coverage area 540 (inner dashed arc). All of the microwave bin coverage areas have areas to the side of the PIR coverage area in which the PIR detector provides no detection. Furthermore, areas beyond the maximum PIR coverage area may be within the MW coverage area. In these areas, the PIR will not be expected to produce a signal. With regard to the typical non-ranging MW area 510, the use of the long range bin 520 ensures that the area beyond the long range bin will not be part of the MW detector coverage calculations. With regard to the areas on both sides of the diagram in which the MW coverage exceeds the PIR coverage, various tactics, such as time delays can be implemented to ensure that the system does not detect a blockage when a target is outside the PIR range, but inside the MW range. Furthermore, proper detector mounting can minimize these areas of concern.

Figure 6:
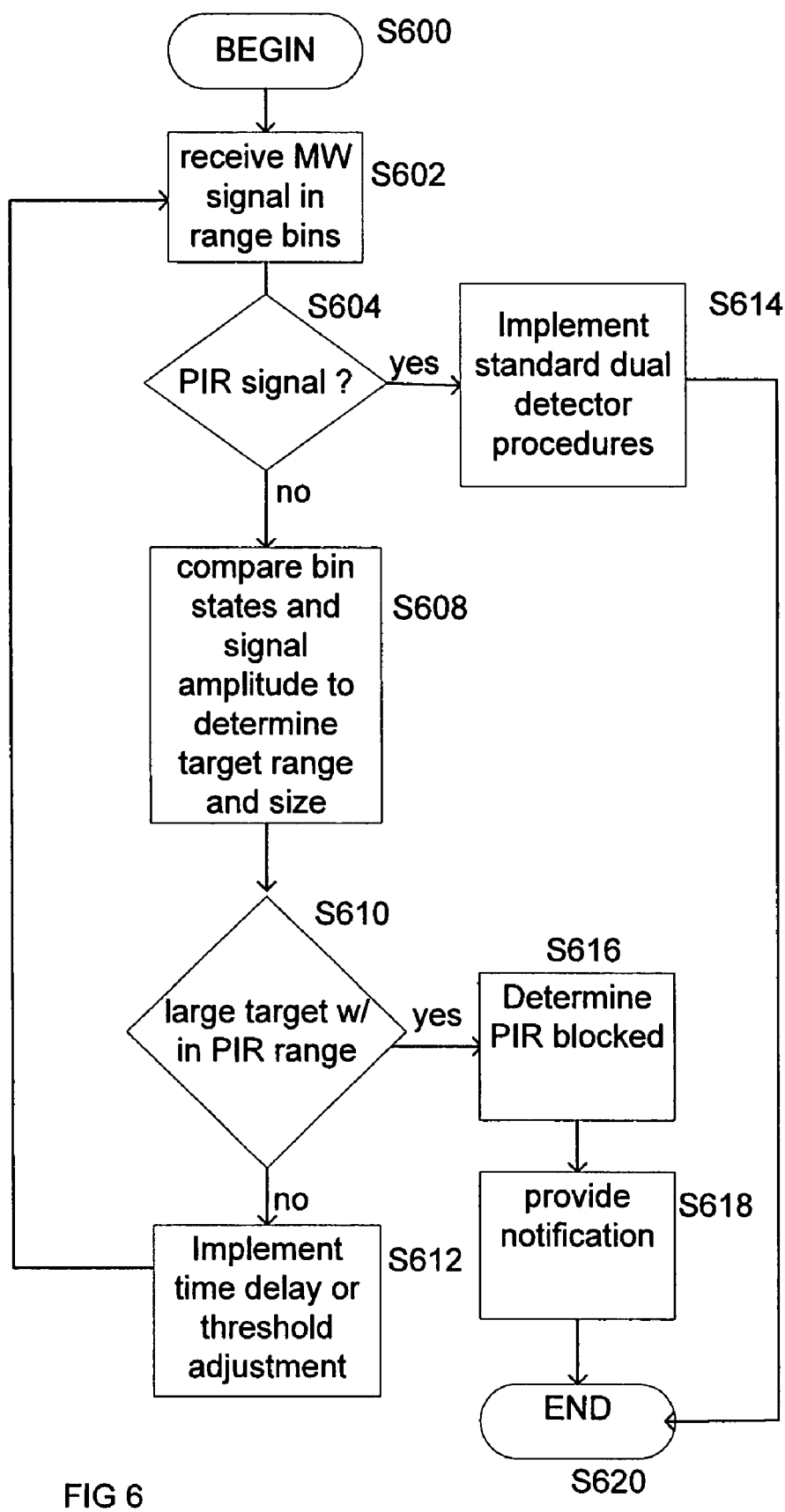
FIG. 6 is a flow chart illustrating a method for range reduction in accordance with an embodiment of the invention.

FIG. 6 is a flow chart illustrating a range reduction method in accordance with an embodiment of the invention. The method begins in S600 and the system receives an MW signal in the appropriate range bins in S602. If a PIR signal has been received in S604, the system implements standard dual detector procedures in S614. If no PIR signal has been received in S604, the system compares bin states and signal amplitudes to determine a target range and size in S608. If the target range is within the PIR range in S610, and if the target is determined to be a human size object and not background MW noise, the system determines that the PIR detector is blocked in S616 and provides notification in S618. If the target range is not within the PIR range in S610, the system implements time delay or threshold adjustment measures in S612 and returns to S602 to receive additional signals. The process ends in S620.

In S602, when the MW signal is received, it is received in one or more of the range bins as set forth above. In S608, the system performs a bin state comparison and signal amplitude analysis to estimate the target range and approximate target size. The insect, short, and mid range bins of the MW detection system aid in determining an approximate range of the target. The long range bin detects all objects within the detector coverage pattern. Each range bin detects targets located between the detector and its maximum range. The system determines the general range of a target by comparing the states of the range bins. A moving target will be detected by each range bin with a maximum range greater than the target range. Accordingly, the estimation of target range of S608 can be determined to be between the maximum range of the longest range bin for which there is no detection and the maximum range of the shortest range bin for which there is detection.

For instance, using the detector parameters of FIG. 4, a target twenty three feet from the detector will generate a signal that will reach both the mid-range bin and the long range bin in S602. The bin state comparison of S608 sorts out which bins have detected a specified target. The signal would not be detected by the insect range bin or the short range bin. Accordingly, the target range/size determination module can ascertain that the target range is between thirteen feet (short range bin maximum range) and thirty six feet (mid range bin maximum range). It also ascertains, based upon range, whether the target size is likely to represent a human, small animal, or other background noise. In general, the algorithms of the range/size detection module operate on the principle that the insect, short range, and mid-range bin detection (and therefore the target range) determine the alarm characteristics that are compared against the long range bin signal. In embodiments of the invention, MW alarm decisions, including target size discrimination, are made as a result of long range bin signal processing.

Step 610 requires a determination of whether the target is within the PIR detector coverage range. In a preferred implementation, in the absence of a PIR signal, if the target is identified as being within the long-range bin, but beyond the short range bin, the PIR sensor may be determined to be blocked. This implementation depends on the short range bin range covering less than 50% of the detector range is illustrated in FIG. 4 above. Various implementations may be utilized and depend upon the configurations of the range bins. One objective of the design is to detect reductions in range due to blockage which reduce the PIR detection area by greater than 50% Various range bin configurations could be utilized and evaluated to achieve this objective or to detect PIR detection area reduction of amounts greater or less than 50%.

Additionally, in further embodiments of the invention, a time delay may be implemented, such that the MW signal in the absence of a PIR signal is required to have a specified duration, for example 2.5 seconds to allow for intruders passing through the MW coverage area to pass into the PIR coverage area.

Alternatively or additionally, the range reduction determination may implement an elevated long range bin signal amplitude threshold in order to help discriminate against targets near the edge of the MW coverage area. In embodiments of the invention, while the MW system uses all bins to determine target range, it uses only the long range bin to determine alarm conditions. In these embodiments, an alarm threshold may be set for the long range bin. In order to help discriminate against targets near the edge of the microwave coverage area beyond the PIR coverage area, where the MW sensitivity may be less than in the center of the coverage area, the threshold may be raised, for instance by 0.2 volts, such that a stronger signal is required for range reduction detection.

Furthermore, upon installation of the dual detection system, an installer can minimize the areas that are not cover by both detectors. Corner mounting of the detector so that walls are close to the edge of the PIR coverage area shown in FIG. 5 may help to minimize these areas and take advantage of any MW attenuation that the walls provide.

Embodiments of the invention utilize a Doppler microwave system capable of detecting an object range. Multiple range limited MW stages may be configured for different ranges to determine the general range of the moving object. Based on signal levels present on these MW stages, an approximate object range is determined. If the object range is within the PIR detection area, and has been determined to be of human size, and no PIR signal has been received, the PIR may be determined to be blocked or disabled and the system generates a notification or triggers an alarm.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for making a range reduction determination within a dual intrusion detector, the dual intrusion detector including at least one microwave sensor having a microwave coverage range and at least one passive infrared sensor having a passive infrared coverage range, the system comprising:

multiple range bins for classifying microwave signals;

a range/size determination module for estimating a target range and size for a detected target based on a state of each of the multiple range bins; and a range reduction component for determining whether at least one passive infrared sensor within the dual intrusion detector has a passive infrared coverage range which has been reduced by 50% or greater due to a blockage.

2. The system of claim 1, the multiple range bins comprising at least a short range bin, a mid-range bin, and a long range bin.

3. The system of claim 2, wherein the range/size determination module estimates the target range based on an identification of each bin receiving a target signal and target size by target range and a long range bin signal amplitude.

4. The system of claim 2, further comprising an insect range bin, the insect range bin having a smaller coverage area than the short range bin.

5. The system of claim 2, wherein the range reduction component identifies a reduced passive infrared coverage range if the target range indicates that the target is located beyond the short range bin and is of sufficient size, and the target fails to generate a passive infrared signal.

6. The system of claim 2, wherein the range reduction component identifies a reduced passive infrared coverage range if the target range indicates that the target is located in the long range bin and is of sufficient size, and the target fails to generate a passive infrared signal.

7. The system of claim 2, further comprising a long range bin that functions as a microwave alarm stage bin.

8. The system of claim 7, wherein the range reduction component incorporates a raised long range bin threshold amplitude, wherein a higher amplitude is required for alarm generation or range reduction notification in the absence of a passive infrared signal, minimizing detection of targets outside the passive infrared coverage range.

9. The system of claim 2, wherein the range reduction component incorporates a time delay component that activates a time delay upon receiving a microwave signal in the absence of a passive infrared signal, thereby allowing a target to move within the passive infrared detection range.

10. The system of claim 1, wherein the range reduction component provides a notification upon detecting a reduced passive infrared coverage range.

11. A method for making a range reduction determination within a dual detector system, the dual detector system including at least one microwave sensor having a microwave coverage area and at least one passive infrared sensor having a passive infrared coverage area, the method comprising:

detecting a microwave signal from a target within the microwave coverage area in the absence of a passive infrared signal;

providing multiple range bins comprising at least a short range bin, a mid-range bin, and a long range bin for determining a target range and size;

determining a target range and size for a detected target from the received microwave signal; and comparing the target range to the passive infrared coverage range to identify a reduced passive infrared coverage range if the target range indicates that the target is located beyond the short range bin and is of sufficient size, and if the at least one passive infrared sensor fails to receive a passive infrared signal from the target.

12. The method of claim 11, wherein determining the target range comprises estimating the target range based on an identification of each bin receiving a target microwave signal and determining the target size comprises estimating the target size based on the target range and a long range bin signal amplitude.

13. The method of claim 11, further comprising providing an insect range bin, the insect range bin having a smaller coverage area than the short range bin.

14. The method of claim 11, further comprising identifying a reduced passive infrared coverage range if the target range indicates that the target is located in the long range bin and is of sufficient size, and the target fails to generate a passive infrared signal.

15. The method of claim 11, further comprising providing the long range bin as a microwave alarm stage bin.

16. The method of claim 15, further comprising incorporating a raised long range bin threshold amplitude to require a higher amplitude for alarm generation or range reduction notification in the absence of a passive infrared signal, minimizing detection of targets outside the passive infrared coverage area.

17. The method of claim 11, further comprising incorporating a time delay upon receiving a microwave signal in the absence of a passive infrared signal, thereby allowing a target to move within the passive infrared detection area.

18. The method of claim 11, further comprising providing a notification upon detecting a reduced passive infrared coverage area.

19. A method for making a range reduction determination for a dual intrusion detector, the dual intrusion detector including at least one microwave sensor having a microwave coverage range and at least one passive infrared sensor having a passive infrared coverage range, the method comprising:

classifying a received microwave signal into a range bin;

estimating a target range and size for a target based on a range bin state comparison; and making a range reduction determination for the passive infrared sensor by:

determining whether or not a passive infrared signal is received by the at least one passive infrared sensor;

determining whether a target is located in the passive infrared coverage range and has a sufficient size to be detected by the at least one passive infrared sensor based on the estimating step; and determining that the at least one passive infrared sensor is blocked if a target of sufficient size is located in the passive infrared coverage range and if the at least one passive infrared sensor does not receive an infrared signal from the target.

20. The method of claim 19, further comprising providing multiple range bins comprising at least a short range bin, a mid-range bin, and a long range bin for determining a target range and size.

21. The method of claim 20, wherein estimating the target range comprises estimating the target range based on an identification of each bin receiving a target microwave signal and estimating the target size comprises estimating the target size based on the target range and a long range bin signal amplitude.

22. The method of claim 20, further comprising providing an insect range bin, the insect range bin having a smaller coverage area than the short range bin.

23. The method of claim 20, further comprising identifying a reduced passive infrared coverage range if the target range indicates that the target is located beyond the short range bin and is of sufficient size, and the target fails to generate a passive infrared signal.

24. The method of claim 20, further comprising identifying a reduced passive infrared coverage range if the target range indicates that the target is located in the long range bin and is of sufficient size and the target fails to generate a passive infrared signal.

25. The method of claim 20, further comprising providing the long range bin as a microwave alarm stage bin.

26. The method of claim 25, further comprising incorporating a raised long range bin threshold amplitude to require a higher amplitude for alarm generation or range reduction notification in the absence of a passive infrared signal, minimizing detection of targets outside the passive infrared coverage range.

27. The method of claim 19, further comprising incorporating a time delay upon receiving a microwave signal in the absence of a passive infrared signal, thereby allowing a target to move within the passive infrared detection area.

28. The method of claim 19, further comprising providing a notification upon detecting a reduced passive infrared coverage area.

29. The system of claim 5, wherein the short range bin is configured to detect targets within a range of about 0 to about 13 feet from the detector.

30. The method of claim 11, wherein the short range bin is configured to detect targets within a range of about 0 to about 13 feet from the detector.

31. The method of claim 11, wherein the step of indentifying a reduced passive infrared coverage range determines whether the at least one passive infrared sensor within the dual intrusion detector has a passive infrared coverage range which has been reduced by 50% or greater due to a blockage.

32. The method of claim 23, wherein the short range bin is configured to detect targets within a range of about 0 to about 13 feet from the detector.

33. The method of claim 19, wherein the passive infrared coverage range extends at least 30 feet from the at least one passive infrared sensor and the step of identifying a reduced passive infrared coverage range determines whether the infrared coverage range has been reduced by 50% or greater due to a blockage.

* * * * *